(12) United States Patent
Mims et al.

(10) Patent No.: US 11,287,073 B2
(45) Date of Patent: Mar. 29, 2022

(54) METHOD AND APPARATUS FOR FRAME ASSEMBLY FOR RTR SCANNER ASSEMBLY

(71) Applicant: Shawcor Ltd., Toronto (CA)

(72) Inventors: Steven Mims, Conroe, TX (US); Ryan Green, Broken Arrow, OK (US); Julian Loiacono, Mons (AU)

(73) Assignee: Desert NDT, LLC, Houston, TX (US)

(*) Notice: Subject to any disclaimer, the term of this patent is extended or adjusted under 35 U.S.C. 154(b) by 0 days.

(21) Appl. No.: 16/664,247

(22) Filed: Oct. 25, 2019

(65) Prior Publication Data
US 2020/0132239 A1 Apr. 30, 2020

Related U.S. Application Data

(60) Provisional application No. 62/751,165, filed on Oct. 26, 2018.

(51) Int. Cl.
*F16L 55/07* (2006.01)
*G01N 23/18* (2018.01)

(52) U.S. Cl.
CPC .............. *F16L 55/07* (2013.01); *G01N 23/18* (2013.01); *G01N 2223/628* (2013.01)

(58) Field of Classification Search
CPC .... F16L 55/07; G01N 23/18; G01N 2223/628
USPC ....................................................... 138/106
See application file for complete search history.

(56) References Cited

U.S. PATENT DOCUMENTS

| | | | | |
|---|---|---|---|---|
| 3,445,655 A | * | 5/1969 | Curry | G01N 23/04 378/171 |
| 4,187,425 A | * | 2/1980 | Thompson | G01N 23/18 378/59 |
| 4,331,034 A | * | 5/1982 | Takeda | G01N 29/265 376/252 |
| 4,434,660 A | * | 3/1984 | Michaels | G01N 29/265 73/619 |
| 5,458,683 A | * | 10/1995 | Taylor | B08B 9/023 118/307 |
| 5,698,854 A | * | 12/1997 | Gupta | G01N 23/18 250/358.1 |
| 7,059,945 B2 | * | 6/2006 | Skinner | B24C 1/08 451/91 |
| 7,656,997 B1 | * | 2/2010 | Anjelly | G01N 23/04 378/59 |
| 9,389,150 B2 | * | 7/2016 | Kimpel, Jr. | G01B 11/0616 |
| 9,726,569 B2 | * | 8/2017 | Koyanagi | G01N 23/005 |
| 2012/0201347 A1 | * | 8/2012 | Prentice | B23K 31/125 378/59 |
| 2014/0156067 A1 | * | 6/2014 | An | G01N 29/2412 700/245 |
| 2014/0338472 A1 | * | 11/2014 | Chang | G01D 11/30 73/865.8 |

* cited by examiner

*Primary Examiner* — Craig M Schneider
*Assistant Examiner* — David R Deal
(74) *Attorney, Agent, or Firm* — Hunton AK, LLP

(57) ABSTRACT

A frame assembly for inspection of pipeline girth weld, having a support frame releasably coupled to a mounting band that comprises of two clamshell halves. The clamshell halves are coupled via quick release coupling mechanisms. By removing one of the clamshells, or uncouple the two clamshells at one coupling point, the frame assembly permits a RTR scanner assembly to be laterally displaced along the length of the pipeline.

7 Claims, 9 Drawing Sheets

METHOD AND APPARATUS FOR FRAME ASSEMBLY FOR RTR SCANNER ASSEMBLY

FIELD

The present disclosure is related to a frame assembly for real time radiography (RTR) scanner assemblies, particularly for oil and gas pipelines.

BACKGROUND

An oil and gas pipeline is typically made from a plurality of lengths of steel pipe welded together utilizing what is often referred to as a "girth weld"—a weld around the perimeter of the steel pipe. Best practices dictate that each girth weld must be inspected to ensure it meets certain quality criteria. There are a variety of methods for girth weld inspection, and one of the commonly used methods is by scanning the weld with a RTR scanner which utilizes radioactive signals to detect the structural integrity of a weld. A metal band is attached around the pipe and a detector assembly, and a radioactive source emitter, are attached to the band. The source emitter and the detector may rotate concentrically, on the metal band, around the weld. The RTR scanners may inspect either or both of the weld sections proximal to the outer diameter and the inner diameter of the pipe, which are known as double-wall-single-image (DWSI) scanners and double-wall-double-image (DWDI) scanners, respectively. The radioactive source emitter and the detector are ideally positioned diametrically opposed to one another around the pipe so that the radioactive signal generated by the source emitter may, after passing through the pipe, be received by the detector on the other side. Thus, during the installation phase at each weld position, time and effort are being spent on properly positioning the detector and emitter on the band.

As a pipeline includes a plurality of weld positions and each of which must be inspected, the RTR scanner and the metal band need to be dismantled and transported, often by a crew of four technicians, from one weld position to the next. The scanner, band, and emitter (which is very heavy), are often manually carried by at least two crew members. This poses significant safety risks to both the crew members and the equipment. Additionally, the metal band mounting mechanisms usually involve complicated mechanical connections that require significant human effort to install and/or dismantle. Typically, the fourth member of the crew is required just to facilitate the installation and dismantling of the metal band, so that the band is ready, in advance, for placement of the scanner and emitter.

The above mentioned factors, combined with the repetitive nature of the task, render the entire process time-consuming and labour/resource intensive.

SUMMARY OF THE INVENTION

According to one aspect of the present invention, there is provided an apparatus for external inspection of a pipeline girth weld, the apparatus comprising: a band releasably mounted circumferentially in close proximity of the pipeline girth weld; a guide rail mounted circumferentially on the band body; a frame assembly movable along the guide rail; a scanner assembly comprising a source emitter and a detector which are operably coupled to the frame assembly, the source emitter capable of generating a detection signal receivable by the detector which provides information regarding the pipeline girth weld.

In certain embodiments, the guide rail is a gear rack, and the frame assembly further comprises a pinion gear for operably engaging the gear rack; wherein upon the pinion gear traversing the gear rack, the frame assembly is circumferentially displaced around the band.

In certain embodiments, the frame assembly further comprises a drive system for rotating the pinion gear along the gear rack.

In certain embodiments, the band further comprises a first band section and a second band section; and the guide rail further comprises a first guide rail section coupled to the first band section, and a second guide rail section coupled to the second band section; wherein the first and second band sections are coupled at a first coupling point and a second coupling point such that when coupled, the first and second guide rail sections form a continuous guide rail.

In certain embodiments, the first coupling point is a quick release buckle and the second couple point is a hook-over hinge.

In certain embodiments, when the frame assembly is coupled to one of the first and second band section that is positioned over a top portion of the pipeline, the other band section may be dismounted such that the apparatus is laterally displaceable along the pipeline.

In certain embodiments, the apparatus further comprises a displacement tool for engaging the frame assembly in order to vertically displace the apparatus above the top portion of the pipeline; wherein the displacement tool further comprises travelling means for traversing along the pipeline.

In certain embodiments, one of the first and second band sections is engaged at one of the first and second coupling points such that a vertical displacement of the frame assembly creates an opening between the uncoupled ends of the first and the second band sections so as to permit the apparatus to be vertically displaced away from the pipeline.

According to a further aspect of the present invention, there is provided a method for displacing an apparatus for external inspection of a pipeline girth weld, the method comprises: removing a first band section positioned over a bottom portion of a pipeline from a second band section that is positioned over a top portion of the pipeline; lifting the second band section, to which the apparatus is connected, vertically above the top portion of the pipeline; displacing the apparatus along the length of the pipeline.

In certain embodiments, the lifting further comprises: engaging a frame assembly of the apparatus to which the scanner assembly is coupled with a displacement tool; manipulating a control mechanism of the displacement tool to vertically raise the displacement tool; and wherein the displacing further comprises operating a travelling mechanism of the displacement tool.

According to a still further aspect of the present invention, there is provided a method for displacing an apparatus for external inspection of a pipeline girth weld, the method comprises: uncoupling one of two coupling points between a first band section and a second band section, where the uncoupled coupling point is in proximity of a bottom portion of the pipeline and the coupled point is in proximity of a top portion of the pipeline; lifting a frame assembly of the apparatus to which the first and second band sections are coupled such that the first and second band sections are dislodged from the surface of the pipeline; and displacing the apparatus laterally along the pipeline.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In various examples, the present disclosure describes a frame assembly for an RTR scanner assembly, suitable for inspecting a girth weld in a pipeline. The disclosed frame assembly may also be used in combination with any other types of suitable pipeline girth weld scanner assemblies. The present disclosure describes a frame assembly that may be operable to maintain a desired alignment between the radioactive source emitter and the detector of the RTR scanner assembly during installation and operation. Due at least in part to its configuration, the disclosed frame assembly may allow an easier installation, dismantling, as well as transportation of the RTR scanner assembly and metal band from one weld position on the pipeline to the next.

Figure 1:
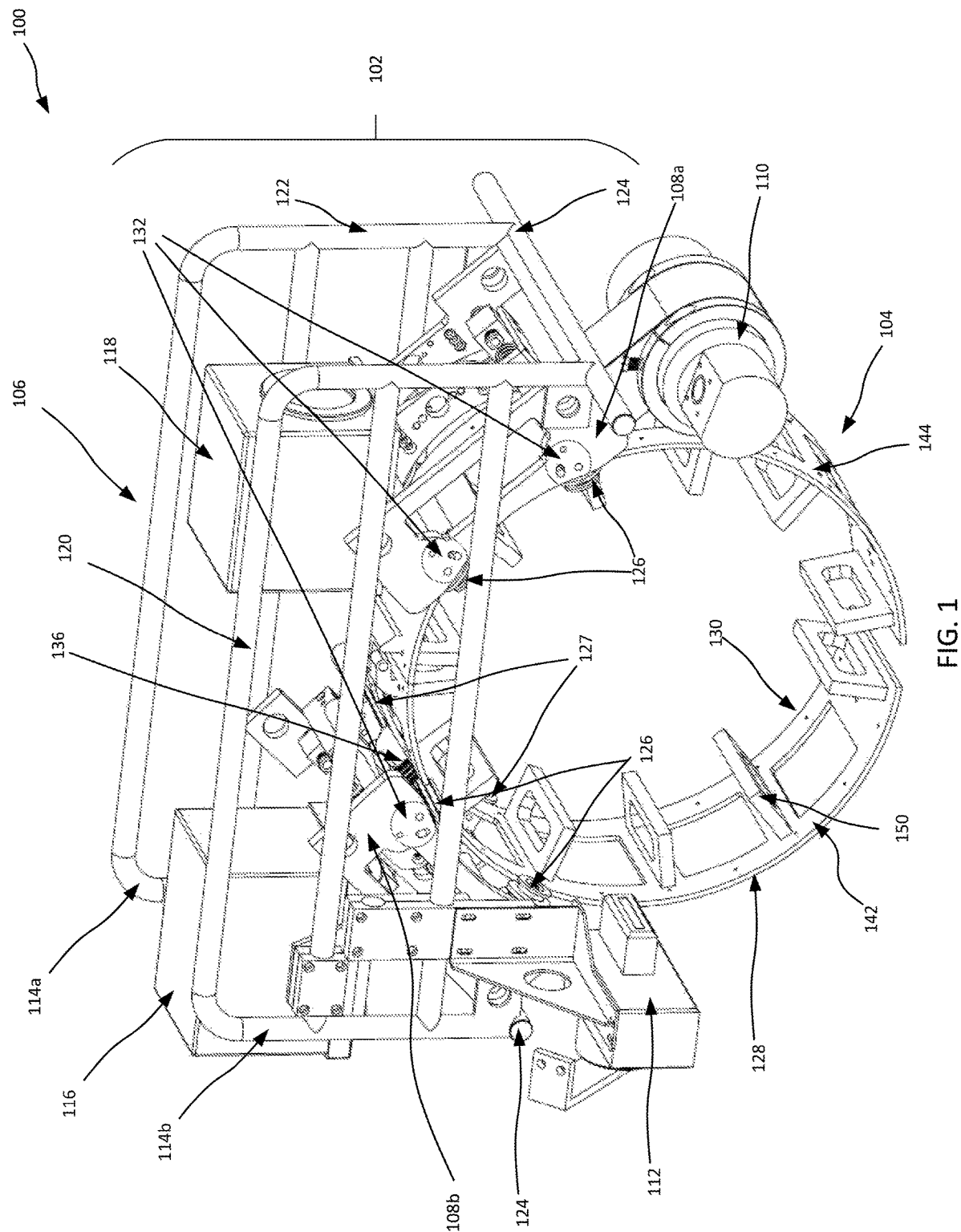
FIG. 1 is a perspective view of an example frame assembly in accordance with the present disclosure to which a RTR scanner assembly is attached, and the coupling points between the two mounting band sections are in the 6 and 12 o'clock position.
Figure 2:
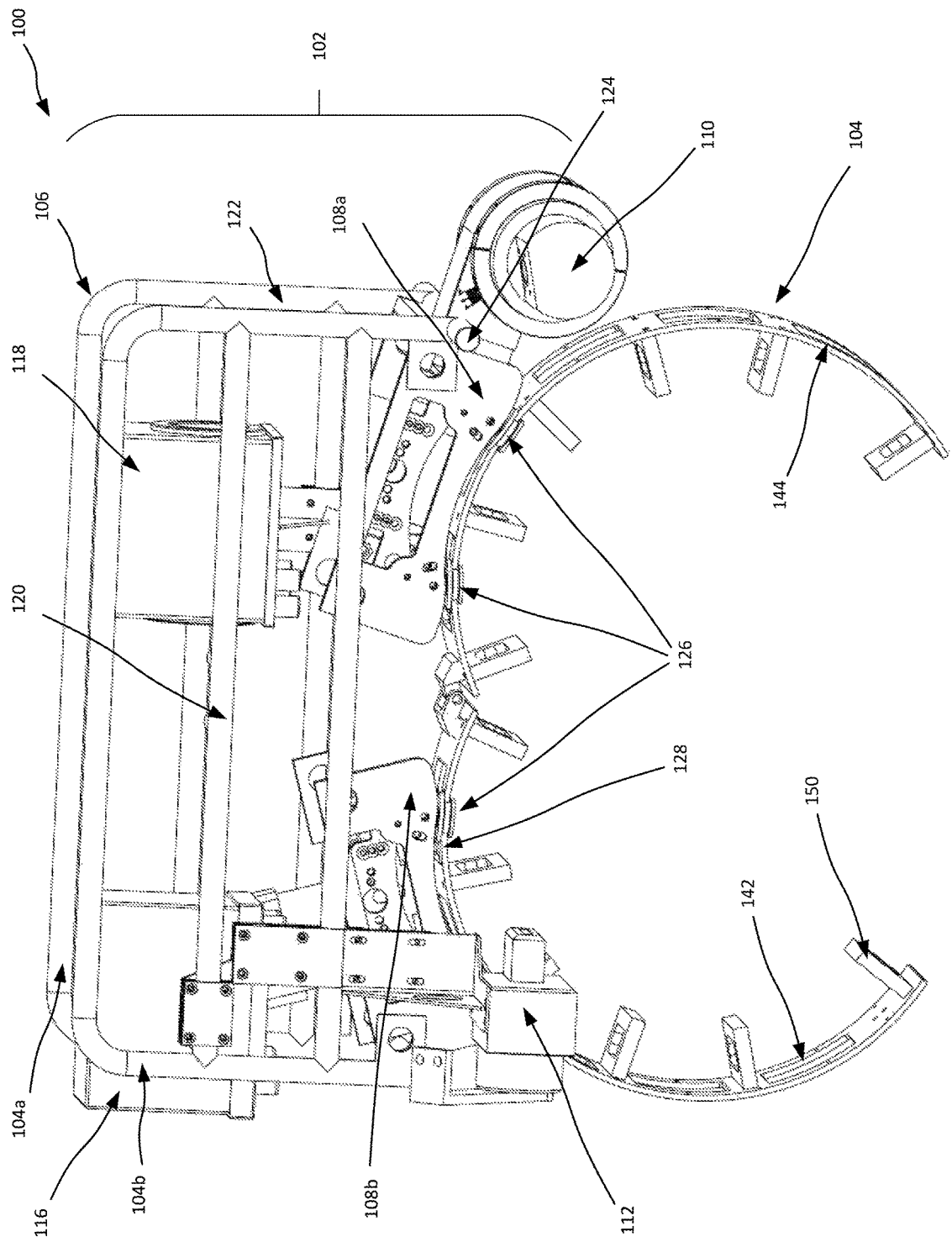
FIG. 2 is a perspective view of the frame assembly in FIG. 1 with the two mounting band sections separated at one end.
Figure 3:
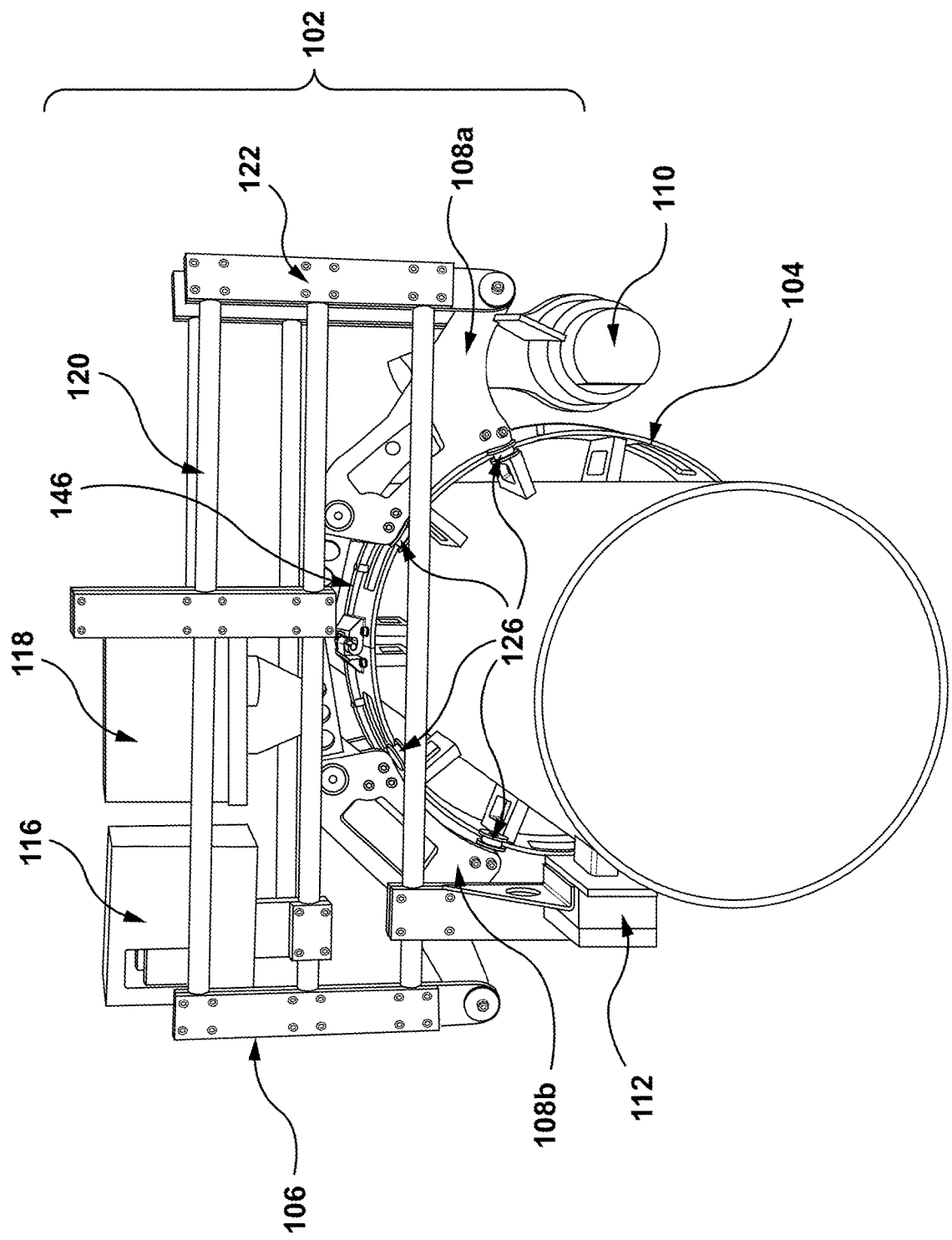
FIG. 3 is a photograph showing another example frame assembly in accordance with the present disclosure positioned around a pipe.

With reference to FIGS. 1 to 3, a frame assembly 100 in accordance with one embodiment of the present disclosure includes a scanner frame section 102 and mounting band 104.

The scanner frame section 102 further includes a support frame 106, as well as mounting mechanisms 108a and 108b. The radioactive source emitter 110 and detector 112 of the RTR scanner assembly may be releasably mounted onto the mounting means 108a and 108b, respectively, as discussed below.

The support frame 106 in the illustrated examples in FIGS. 1 and 2 includes a pair of identical railing structures 114a and 114b. A cooling compartment 116 and a electronic component/controller compartment 118 of the RTR scanner assembly may be releasably mounted onto the railing structures 114a and 114b. In the case of a RTR scanner assembly, the radioactive source emitter 110 typically contains a lead component (ie. a casing) used for directional guidance of the radioactive signal which has significant weight and may place considerable strain on the drive elements if not properly balanced. Thus, in some examples of the present disclosure, such as the one shown in FIG. 3, the cooling compartment 116 and the electronic component compartment 118 of the RTR assembly, along with other elements of the frame assembly, may be positioned to the side of support frame 106 that is opposite of the side on which the source emitter 110 is located to improve the weight distribution profile of the frame assembly 100. As shown, each of the railing structures 114a and 114b is comprised of a plurality of horizontal support bars 120 jointed at the ends by vertical support bars 122. It is to be appreciated that other types of support frame structure that are commonly known in the art may be adopted for support frame 106.

The mounting mechanism 108a and 108b provides mounting surfaces on which the radioactive source emitter 110 and detector 112 of the RTR scanner assembly to be releasably coupled. Alternatively, in some examples of the present disclosure, the emitter 110 and detector 112 may also be coupled onto the support frame 106. Both the source emitter 110 and the detector 112 extend transversely away from the mounting band 104 such that no part of the frame assembly 100 may interfere with the radioactive signal that passes therebetween. The mounting mechanisms 108a, 108b are connected to the support frame 106 at hinge joints 124 as shown in FIGS. 1 and 2 such that the mounting means 108a, 108b may rotate freely about joints 124.

The mounting mechanisms 108a and 108b are also configured for mounting and circumferential displacement around mounting band 104. Each of mounting mechanisms 108a and 108b comprises a plurality of displaceable wheels 126 and fixed wheels 127 for engaging with mounting band 104. In particular, as shown, each mounting mechanisms 108a and 108b includes two displaceable wheels 126 on one side and two fixed wheels 127 on the opposing side, with each of the wheels 126 and 127 having grooves for engaging with engagement surfaces 128 and 130 of the mounting band 104. It may be readily appreciated that the number of wheels may vary based on factors such as length of pipe, and that other suitable displacement mechanisms, such as ball and bearing slides and others known in the art, may be used to facilitate circumferential displacement of the mounting mechanism 108a and 108b around the mounting band 104.

In the illustrated example, each of the displaceable wheels 126 are releasably coupled to the mounting mechanism 108a and 108b by connectors 132 which may be manipulated from a closed position to an open position. With the connectors 132 in the open position, the displaceable wheels 126 may be moved linearly to create sufficient space between opposing displaceable wheel 126 and fixed wheel 127 to remove or place the frame section 102 onto the mounting band 104. By manipulating the connectors 132 from the open position to the closed position, the displaceable wheels 126 are linearly displaced towards its opposing fixed wheel 127 and causes both wheels to engage with the engagement surfaces 128 and 130 of the mounting band 104, respectively. Thereby clamping the mounting band 104 in between the grooves of the wheels 126 and 127, and, as a result, the entire frame section 102 is coupled onto the mounting band 104. Once mounted onto the mounting band 104, the frame section 102 may freely rotate around the mounting band 104, and as a result, around the circumference of the pipe, through the free rotation of wheels 126 and 127.

Figure 4A:
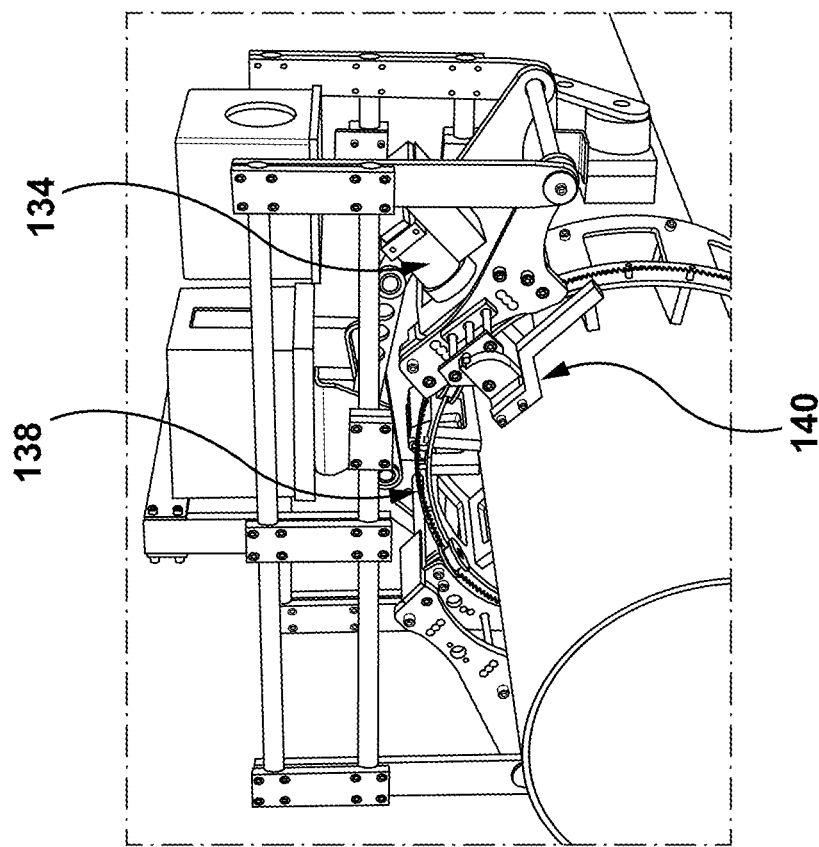
FIGS. 4A and 4B are photographs showing a lever in open and closed positions on the frame assembly in FIG. 3.
Figure 4B:
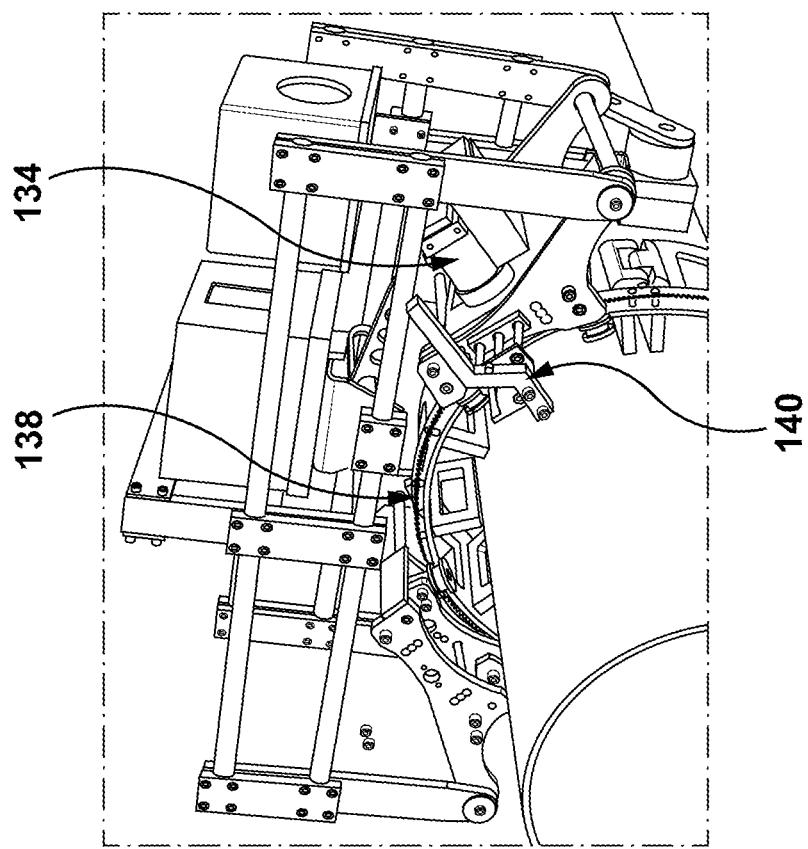

The frame section 102 also comprises motor 134, which, as shown in FIGS. 4A and 4B, is an electric motor configured to turn a pinion gear 136. The pinion gear 136 may be moved from an engaged position, where it engages mating teeth on gear rack 138 of mounting band 104, to a disengaged position, where pinion gear 136 does not engage the gear rack 138 (for example, in the disengaged position, pinion gear 136 may spin freely). The pinion gear 136 can be moved from its engaged position to its disengaged position (and back) by rotating a lever 140 from an "open" position as shown in FIG. 4A to a "closed" position as shown in FIG. 4B.

When the frame section 102 is clamped onto the mounting band 104, with pinion gear 136 is in its disengaged position, the frame section 102 may freely rotate around the mounting band 104, and hence around the pipe. With pinion gear 136 in its engaged position, the frame section 102 will rotate around the mounting band 104 (and the pipe) when the pinion gear 136 is rotated by the activation of motor 134. The motor 134 is, in certain embodiments, configured to be able to rotate the pinion gear 136 in both directions, and since motor 134 (again, in certain embodiments) has a brake when it is not activated, rotation of the frame section 102 can be controlled, both in speed and direction, by the controlling of motor 134, and can be affixed in position onto the mounting band 104 when pinion gear 136 is engaged and the motor brake is on.

Figure 5:
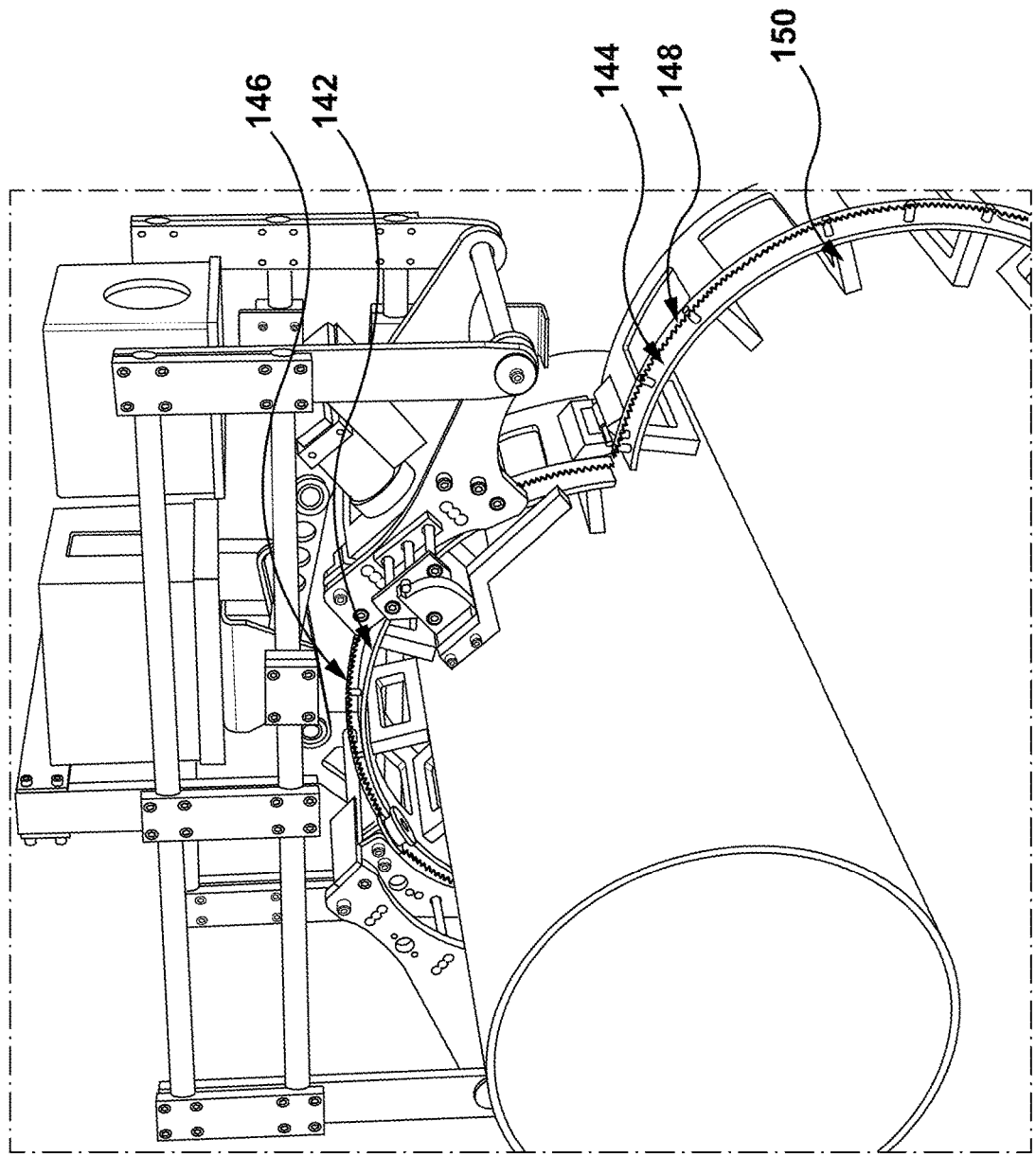
FIG. 5 is a photograph showing dismantling of one of the clamshells of the mounting band in FIGS. 4A and 4B.

With reference to FIG. 5, the mounting band 104 is formed from a first clamshell 142 and a second clamshell 144, which may be assembled together over the pipe to form a continuous mounting band encircling the pipe. The gear rack 138 is also formed from a first gear rack section 146 and a second gear rack section 148, each of which is concentrically mounted onto the clamshells 142, 144 respectively. When the upper and lower clamshells 142, 144 are assembled together, the first and second gear rack section 146, 148 are continuous to allow the pinion gear 136 to traverse the gear rack 138 unimpeded. It would be appreciated that the second gear rack section 148, would look and be positioned identically to the first gear rack section 146.

Formed on the interior surface of each of the clamshells 142, 144 are a plurality of spacers 150. The spacers 150 provide structural support for the mounting band 104 over the exterior surface a pipe. The dimensions and the number of spacers 150 may be dependent on factors that include, but not limited to, circumference and width of the mounting band, as well as the weight of the RTR scanner assembly. In certain embodiments, the spacers 150 may be removable for replacing with spacers of different lengths, for use of the assembly on pipes of different circumferences.

Figure 6B:
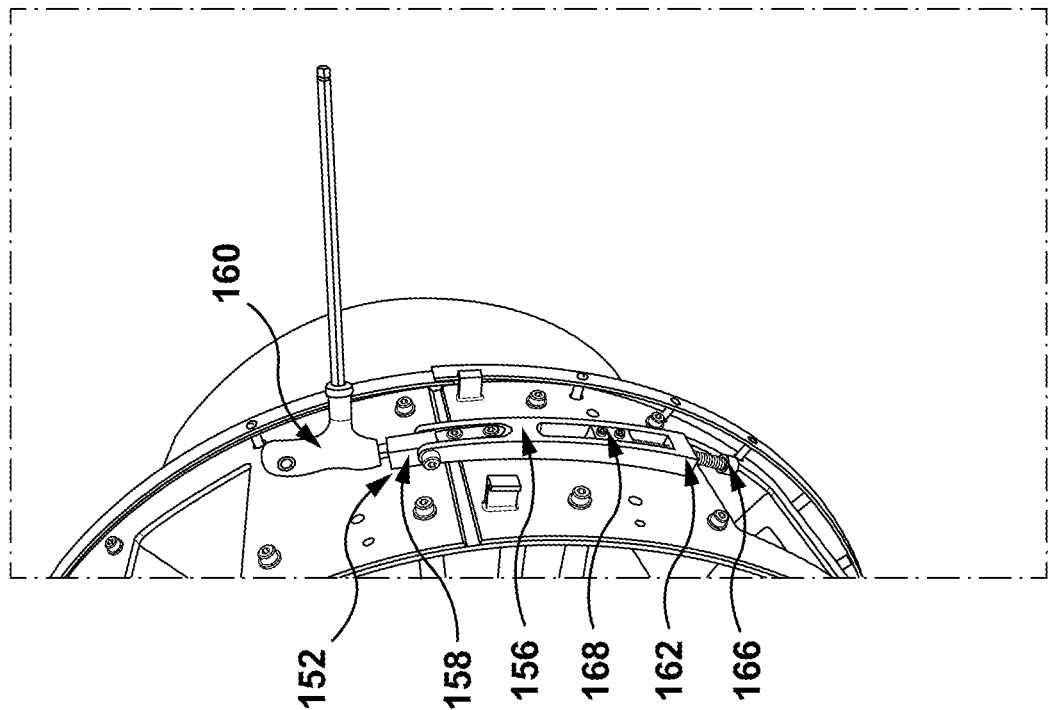
FIGS. 6A and 6B are photographs showing a front elevation view and a perspective view of the quick release buckle in accordance with the present disclosure.
Figure 6A:
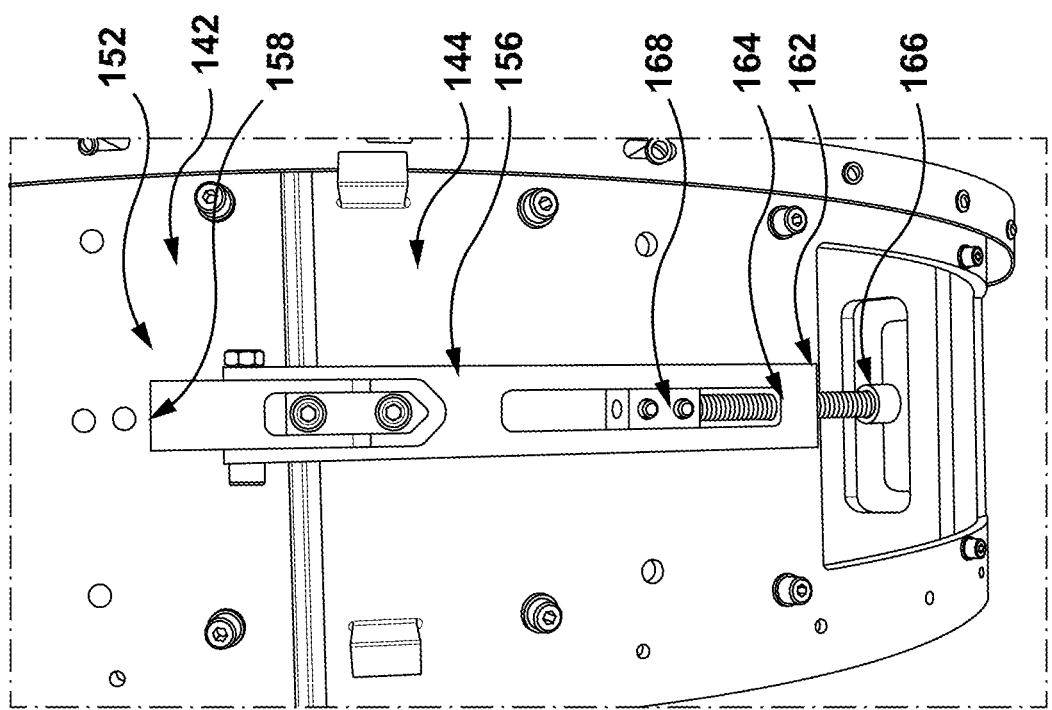
Figure 7B:
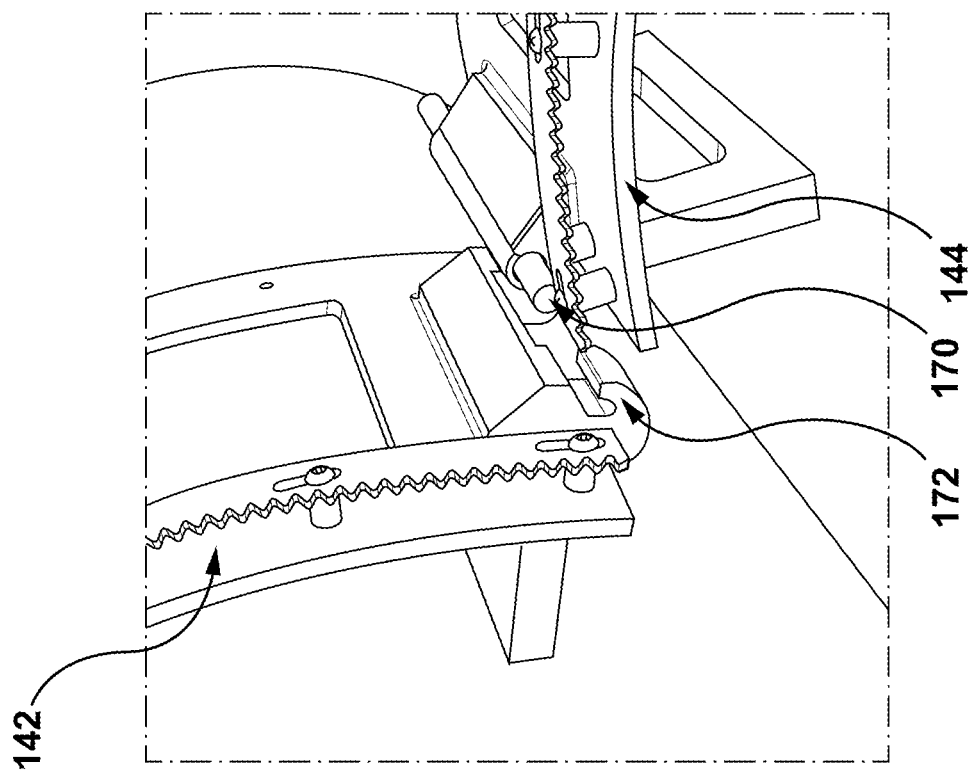
FIGS. 7A and 7B are photographs showing perspective views of the hook-over hinge in accordance with the present disclosure that is used to couple two clamshells of the mounting band in engaged and dismantled state respectively.
Figure 7A:
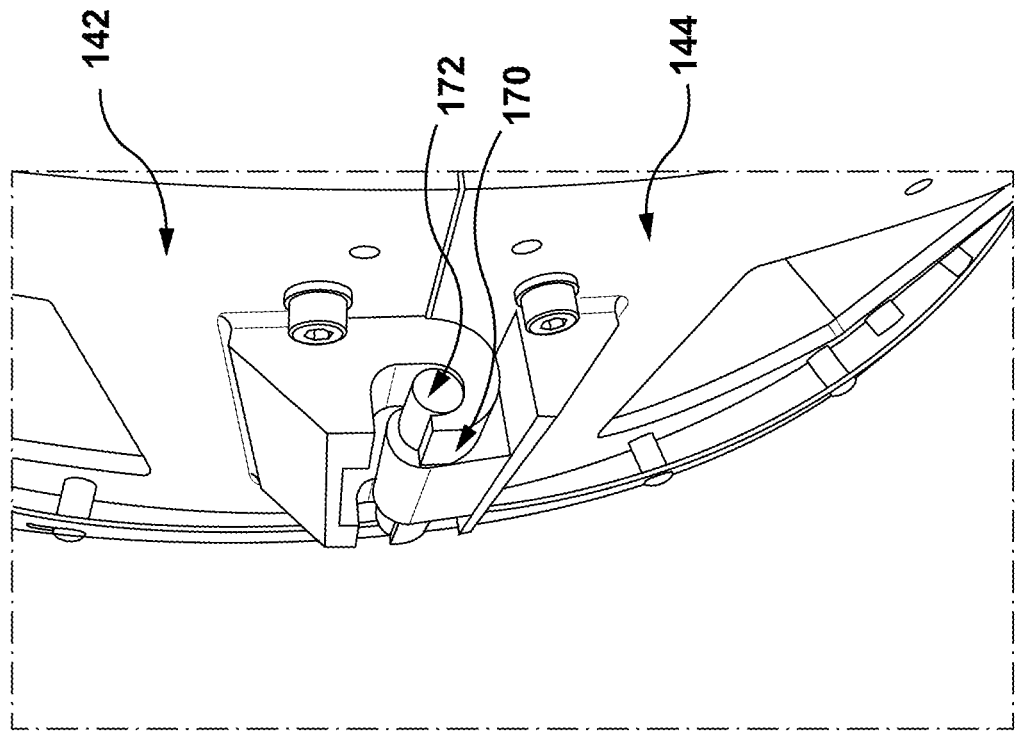

The clamshells 142, 144 are coupled using a cam-action quick release buckle 152 as shown in FIGS. 6A and 6B on one end, and a hook-over hinge 154 as shown in FIGS. 7A and 7B on the other end.

In the illustrated example in FIGS. 6A and 6B, the quick release buckle 152 includes a handle bar 156 which has a hole (not shown) formed on a first handle bar end 158. The hole is capable of accommodating an installation tool 160 to more easily facilitate the engagement or release the cam force. On a second handle bar end 162, a threaded opening 164 is formed to receive a bolt 166. A block 168 formed on the exterior surface of the second clamshell 144 is configured with a hole for threadingly receiving the bolt 166 which may serve to secure and/or further tighten the latch.

FIGS. 7A and 7B show the hook-over hinge 154 in closed and open positions, respectively. As shown, a hook 170 is formed near one end of the first clamshell 142. On the corresponding end on the second clamshell 144, a hinge pin 172 is formed such that it may be received by the hook 170.

During assembly of the illustrated mounting band 104, after the first clamshell 142 has been placed over a top portion of a pipe, hook-over hinge 154 is connected by inserting hinge pin 172 into hook 170. The second clamshell 144 is then placed over a lower portion of the pipe and the quick-release buckle 152 is engaged to complete the coupling of the first and second clamshells 142, 144 around the pipe. The mounting band 104 may be dismantled from the pipe by reversing the foregoing steps. Advantageously, the mounting band 104 in accordance with the present disclosure may be quickly assembled over or dismantled from a pipe with less effort and time compared to the prior art.

In some examples of the present disclosure, one of the first clamshell 142 or second clamshell 144 may be positioned over a top portion of a pipe with its ends located at the 3 and 9 o'clock positions as best shown in FIG. 5. The RTR scanner assembly may be connected to the clamshell on top of the pipe. It is to be appreciated that in this configuration, the RTR scanner assembly and the attached clamshell can be displaced laterally along the length of the pipe without removing the scanner assembly from the top of the pipe. By removing the bottom clamshell, any lateral displacement along the pipeline would not be impeded by any of the pipeline support structures typically located at the under side of the pipeline.

Figure 8:
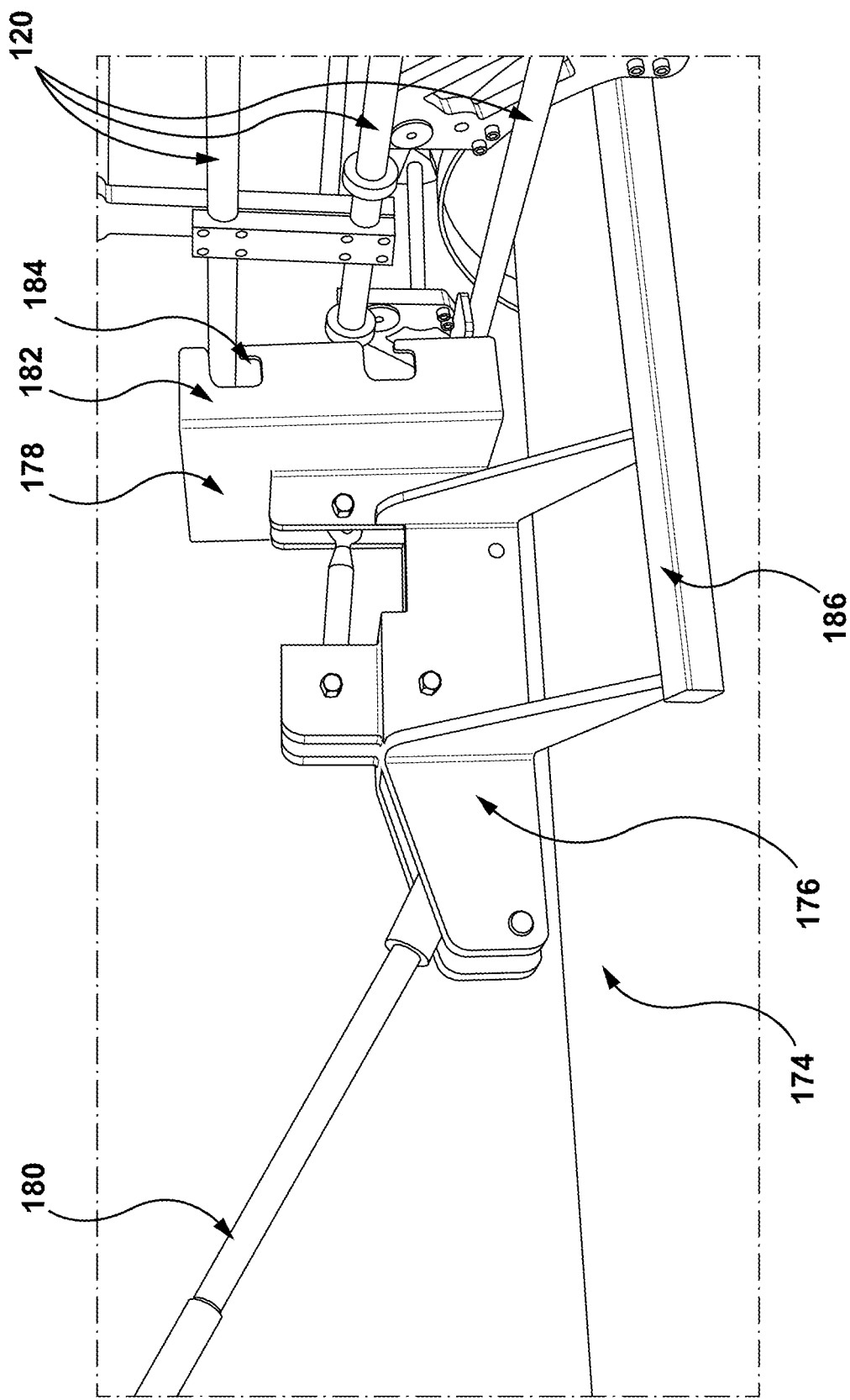
FIG. 8 is a photograph showing a perspective view of the mechanical jack in accordance with the present disclosure.

In some examples of the present disclosure, a mechanical jack 174 as shown in FIG. 8 is provided to facilitate lateral movement of one of the clamshell and the scanner assembly along the length a pipe. The mechanical jack 174 includes a main frame 176 with a lift plate 178 which may be raised or lowered by operating a handle 180. The lift plate 178 is configured to engage a portion of the support frame 106. In the illustrated example, the lift plate 178 has two side panels 182 projecting outwardly perpendicular to the lift plate 178. Each of the side panels 182 has two lifting grooves 184 formed thereon for engaging two of the horizontal support bars 120 of the support frame 106. The engagement of multiple support bars 120 by the lift plate 178 at least in part ensures only vertical displacement of the load.

Two guide rails 186 are attached to either side of the main frame 176 such that when placed on a pipe, the guide rails 186 are parallel to the length of the pipe. A plurality of wheels or rollers (not shown) are located inside the guide rail 186 to permit linear motion along the pipe. The wheels and/or rollers may also serve to prevent any circumferential movement of the jack 174 on the surface of the pipe via frictional force. The guide rails 186 are of sturdy construction and have a length that, when the lift plate 178 engages support frame 106, the guide rails extend beyond the center of gravity of the load to prevent tipping over.

Accordingly, once the clamshell on the underside of the pipe has been removed, the mechanical jack 174 may slide along the pipe until the lift plate 178 engages the support frame 106. The lift plate 178 is then elevated vertically by manipulating the jack handle 180 to lift the load off of the surface of the pipe. A crew member may simply push the entire structure along the length of the pipe on the wheels or rollers of the guide rails 184, to the next weld position where the load may be lowered. One crew member may then connect the bottom clamshell by engaging the hook-over hinge 154 and the quick release buckle 152. This would obviate the risks to the crew and the equipment arising from the heavy lifting of the RTR scanner assembly from one weld position to the other. Further it would preserve the alignment between the radioactive source emitter 110 and detector 112 for all weld inspections. The manner in which only one of the clamshells of the mounting band need to be removed or connected between inspections, coupled with the coupling mechanisms used to connect the two clamshells of the mounting band may advantageously result in significant savings in time and human effort.

In some examples of the present disclosure, the clamshells 142 and 144 are configured such that the hook-over hinge 154 is positioned at the 12 o'clock position and the quick release buckle 152 is positioned at the 6 o'clock position as best shown in FIGS. 1 and 2. In this configuration, each of mounting mechanisms 108a and 108b are connected to the first and second clamshells 142 and 144, respectively. When the quick release buckle 152 is disengaged, the first and second clamshells 142, 144 may be separated to create sufficient space in between the disconnected ends of the clamshells so that the entire frame and scanner assembly may be lifted vertically off of the pipe.

Figure 9B:
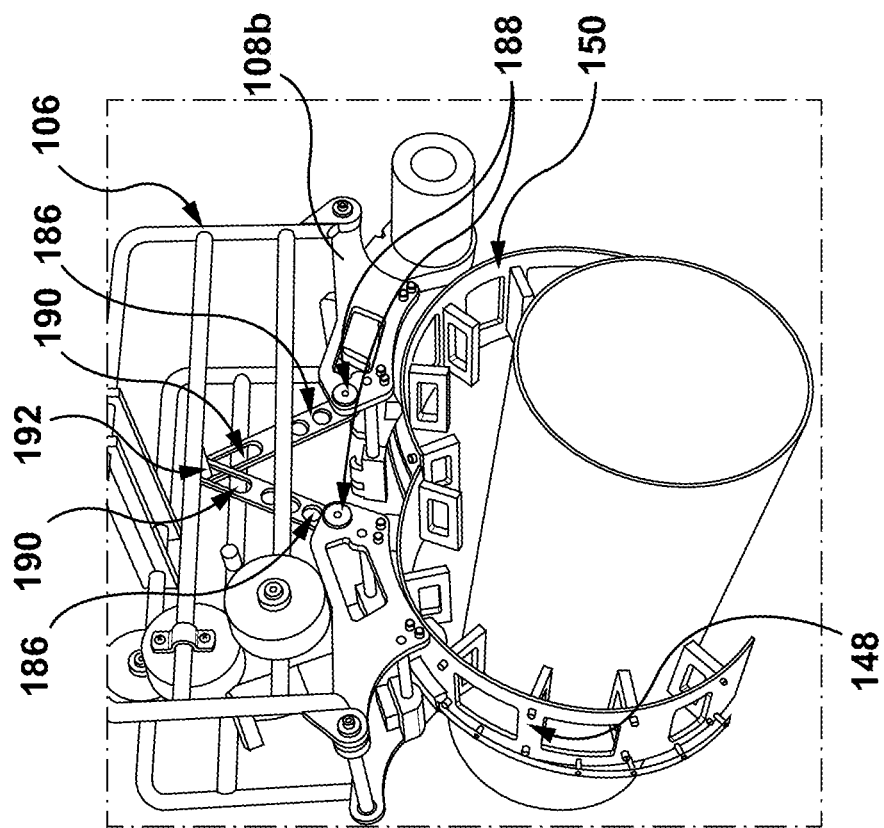
FIGS. 9A and 9B are photographs showing perspective views of another example frame assembly in accordance with the present disclosure where the mounting mechanism bars are in collapsed and raised states respectively.
Figure 9A:
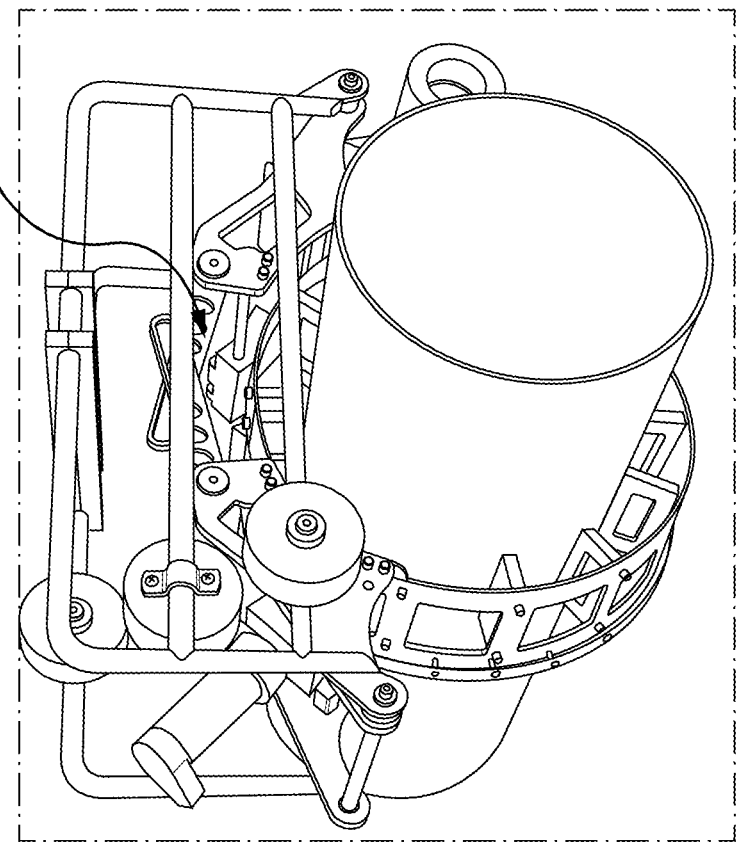

In the example shown in FIGS. 9A and 9B, a bar 186 is coupled to each of mounting mechanisms 108a and 108b and may freely rotate about a joint 188 with respect to the mounting mechanisms. Each bar 186 includes a guide slot 190 that is sized to accommodate a pin 192 which may freely move along the length of the slot 190. As shown in FIG. 9A, when the mounting band 104 is positioned around a pipe, the bars 186 are in a collapsed position. In FIG. 9B, force is applied to pin 192 either by manual means or by a suitable machinery such as a crane vehicle. The pin 192 would in turn lift the bars 186 to a "raised" state, whereby further lifting force applied to pin 192 would rotate each of the two mounting mechanisms 108a and 108b around hinge joint 124. As the quick-release buckle 152 is disengaged, the rotation of mechanisms 180a and 180b would force apart the clamshells 142, 144 so as to create a gap between the unconnected ends of the clamshells. The gap may be sufficient to permit the mounting band 104, and by extension the frame assembly 100 to be lifted off of the pipe unimpeded.

The entire frame and scanner assembly, with the bars 186 in its "raised" state, may then moved to the next weld inspection location. Upon reaching the next desired location, the entire frame and scanner assembly may be lowered onto the pipe until the bars 186 return to their "collapsed" state. The installation may be completed by engaging the quick-release buckle 152.

The embodiments of the present disclosure described above are intended to be examples only. The present disclosure may be embodied in other specific forms. Alterations, modifications and variations to the disclosure may be made without departing from the intended scope of the present disclosure. While the system, devices and processes disclosed and shown herein may comprise a specific number of elements/components, the systems, devices and assemblies could be modified to include addition or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and subranges within disclosed ranges are also disclosed. The subject matter described herein intends to cover and embrace all suitable changes in technology. All references mentioned are hereby incorporated by reference in their entirety.

The invention claimed is:

1. An apparatus for external inspection of a pipeline girth weld on a pipeline, the apparatus comprising:
    a band releasably mounted circumferentially in close proximity of the pipeline girth weld;
    a guide rail mounted circumferentially on the band;
    a frame assembly movable along the guide rail;
    a scanner assembly comprising a source emitter and a detector which are operably coupled to the frame assembly, the source emitter capable of generating a detection signal receivable by the detector which provides information regarding the pipeline girth weld, wherein
    the band further comprises a first band section and a second band section; and
    the guide rail further comprises a first guide rail section coupled to the first band section, and a second guide rail section coupled to the second band section;
    wherein the first and second band sections are coupled at a first coupling point and a second coupling point such that when coupled, the first and second guide rail sections form a continuous guide rail.

2. The apparatus of claim 1, wherein
    the guide rail is a gear rack, and
    the frame assembly further comprises a pinion gear for operably engaging the gear rack;
    wherein upon the pinion gear traversing the gear rack, the frame assembly is circumferentially displaced around the band.

3. The apparatus of claim 2, wherein the frame assembly further comprises a drive system for rotating the pinion gear along the gear rack.

4. The apparatus of claim 1, wherein the first coupling point is a quick release buckle and the second couple point is a hook-over hinge.

5. The apparatus of claim 1, wherein when the frame assembly is coupled to one of the first and second band sections that is positioned over a top portion of the pipeline, the other band section may be dismounted such that the apparatus is laterally displaceable along the pipeline.

6. The apparatus of claim 5, further comprising
    a displacement tool for engaging the frame assembly in order to vertically displace the apparatus above the top portion of the pipeline;
    wherein the displacement tool further comprises a travelling mechanism coupled to the frame for traversing an exterior surface of the pipeline in a lengthwise direction of the pipeline.

7. The apparatus of claim 1 wherein one of the first and second band sections is engaged at one of the first and second coupling points such that a vertical displacement of the frame assembly creates an opening between the uncoupled ends of the first and the second band sections so as to permit the apparatus to be vertically displaced away from the pipeline.

* * * * *